(12) United States Patent
Matsui

(10) Patent No.: US 10,620,887 B2
(45) Date of Patent: Apr. 14, 2020

(54) IMAGE FORMING APPARATUS AND INFORMATION PROCESSING APPARATUS CONFIGURED TO PRINT A SPECIFIED PAGE OF A PLURALITY OF DOCUMENTS, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Kenta Matsui, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/792,930

(22) Filed: Oct. 25, 2017

(65) Prior Publication Data

US 2018/0046414 A1 Feb. 15, 2018

Related U.S. Application Data

(63) Continuation of application No. 14/873,640, filed on Oct. 2, 2015, now Pat. No. 9,836,252.

(30) Foreign Application Priority Data

Oct. 14, 2014 (JP) .................................. 2014-210168

(51) Int. Cl.
G06F 3/12 (2006.01)
(52) U.S. Cl.
CPC .......... *G06F 3/1206* (2013.01); *G06F 3/1205* (2013.01); *G06F 3/1244* (2013.01);
(Continued)

(58) Field of Classification Search
CPC .... G06F 3/1206; G06F 3/1248; G06F 3/1275; G06F 3/1205; G06F 3/1244; G06F 3/1253; G06F 2206/1514
(Continued)

(56) References Cited

U.S. PATENT DOCUMENTS

| | | | |
|---|---|---|---|
| 5,704,722 A | * | 1/1998 | Kanou ....................... B41J 5/30 400/103 |
| 6,449,062 B1 | | 9/2002 | Endo |

(Continued)

FOREIGN PATENT DOCUMENTS

| | | |
|---|---|---|
| JP | 2007042023 A | 2/2007 |
| JP | 2008210401 A | 9/2008 |

OTHER PUBLICATIONS

Office Action issued in U.S. Appl. No. 14/873,640 dated May 6, 2016.
(Continued)

*Primary Examiner* — Allen H Nguyen
(74) *Attorney, Agent, or Firm* — Rossi, Kimms & McDowell LLP

(57) ABSTRACT

An image forming apparatus that analyzes and prints a job including a plurality of documents, comprises: a management unit configured to obtain information of a page to be printed, which is designated in the job, and manage the information as a print range; and an analysis unit configured to analyze each of the plurality of documents included in the job, wherein the analysis unit calculates the number of pages of each of the plurality of documents, and based on the number of pages of each of the plurality of documents, specifies the page to be printed indicated by the print range out of the plurality of documents.

21 Claims, 8 Drawing Sheets

(52) U.S. Cl.
CPC .......... *G06F 3/1248* (2013.01); *G06F 3/1253* (2013.01); *G06F 3/1275* (2013.01); *G06F 2206/1514* (2013.01)

(58) Field of Classification Search
USPC .............................. 358/1.18, 1.13, 1.15, 1.16
See application file for complete search history.

(56) References Cited

U.S. PATENT DOCUMENTS

| | | | |
|---|---|---|---|
| 7,929,174 | B2 | 4/2011 | Nakagiri et al. |
| 8,270,025 | B2 | 9/2012 | Xu |
| 8,817,297 | B2 | 8/2014 | Pinney |
| 2003/0053113 | A1* | 3/2003 | Nishikawa ............ G06F 3/1205 358/1.14 |
| 2003/0067625 | A1* | 4/2003 | Kim ...................... G06K 15/00 358/1.15 |
| 2005/0094196 | A1* | 5/2005 | Saito .................... G06F 3/1205 358/1.15 |
| 2007/0030507 | A1 | 2/2007 | Kaneko |
| 2008/0144091 | A1 | 6/2008 | Oshima |
| 2010/0232910 | A1 | 9/2010 | Hirai |
| 2011/0141506 | A1* | 6/2011 | Sato .................... G06F 3/1208 358/1.12 |
| 2012/0105912 | A1 | 5/2012 | Morooka |
| 2013/0258389 | A1* | 10/2013 | Omura .................. G06F 3/1297 358/1.14 |
| 2013/0293911 | A1* | 11/2013 | Watanabe ............. G06F 3/1204 358/1.13 |
| 2014/0092410 | A1* | 4/2014 | Taima ................... G06F 3/1234 358/1.13 |
| 2014/0104642 | A1* | 4/2014 | Sugawara ............. G06F 3/1211 358/1.15 |
| 2014/0145987 | A1* | 5/2014 | Nishimura ......... H04N 1/00411 345/173 |
| 2014/0317481 | A1 | 10/2014 | Sawada |
| 2014/0365757 | A1* | 12/2014 | Masuyama ............... G06F 1/24 713/2 |

OTHER PUBLICATIONS

Office Action issued in U.S. Appl. No. 14/873,640 dated Oct. 3, 2016.
Office Action issued in U.S. Appl. No. 14/873,640 dated Feb. 9, 2017.
Notice of Allowance issued in U.S. Appl. No. 14/873,640 dated Jul. 27, 2017.
Office Action issued in Japanese Application No. 2014-210168 dated Jul. 30, 2018.

* cited by examiner

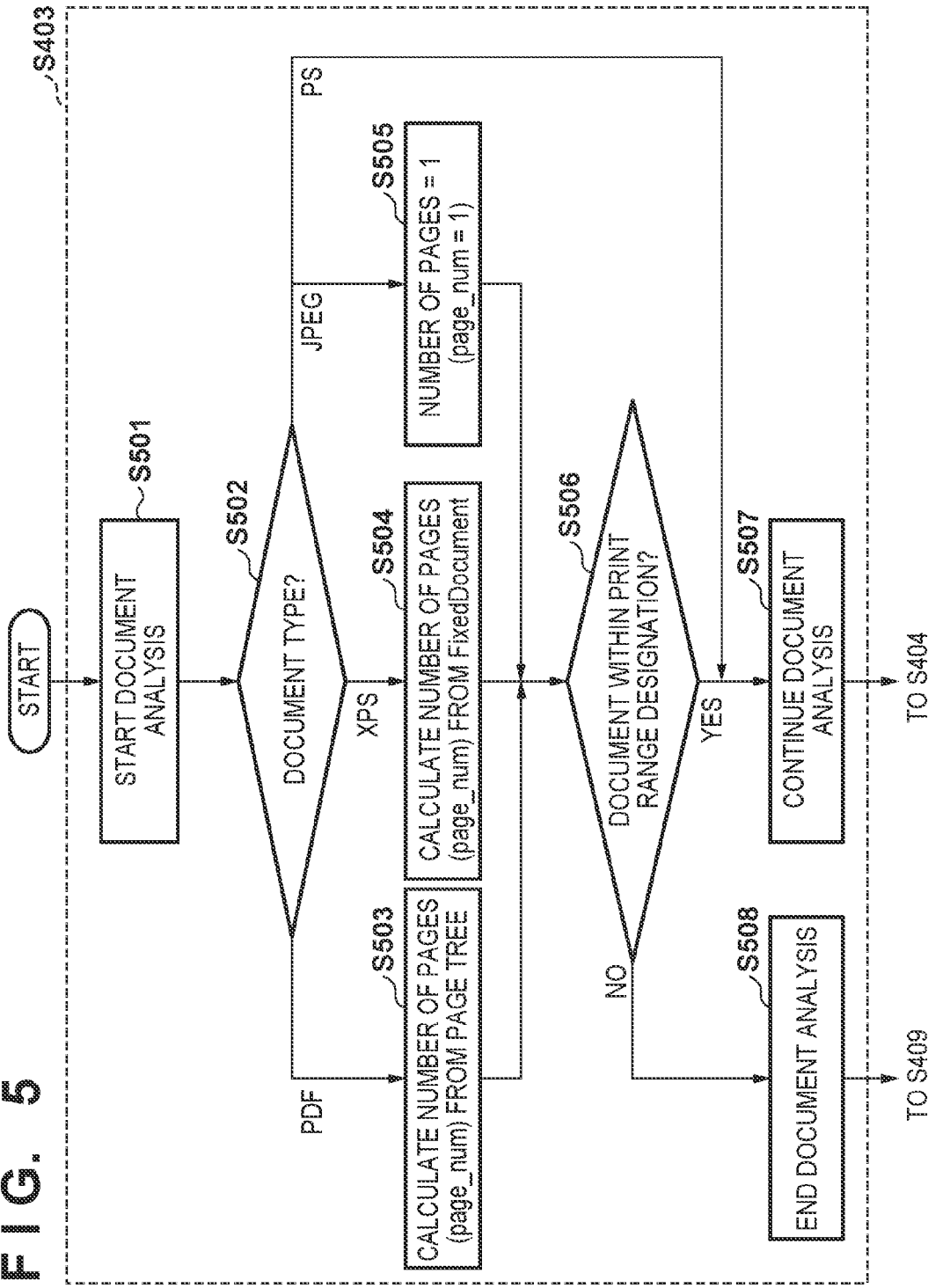

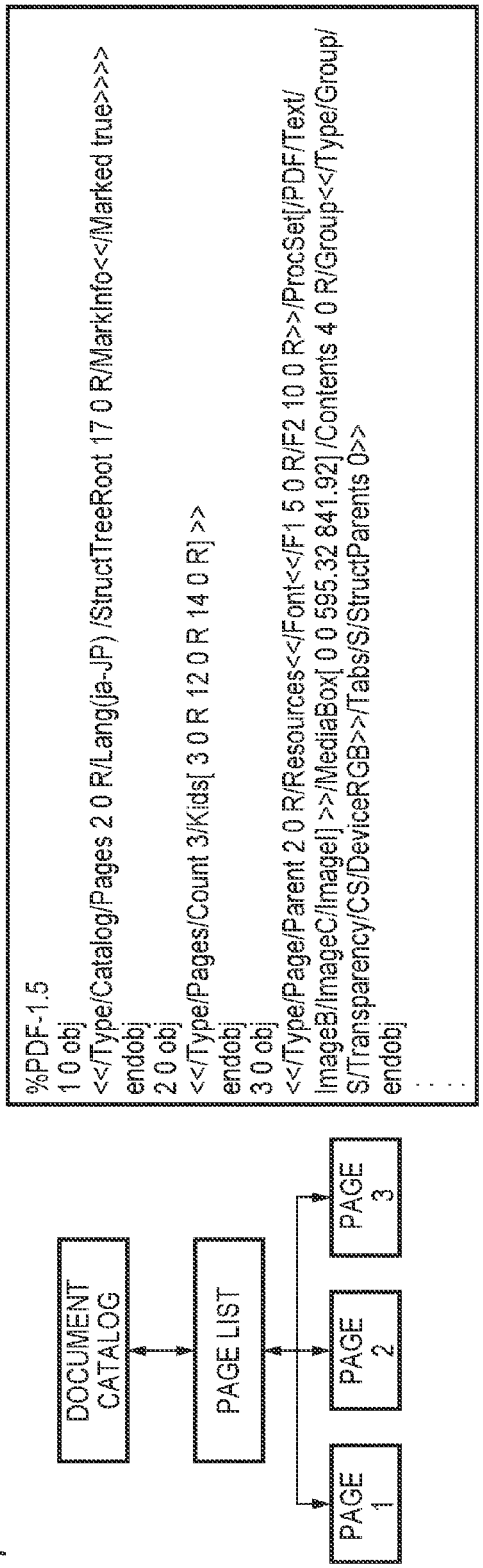
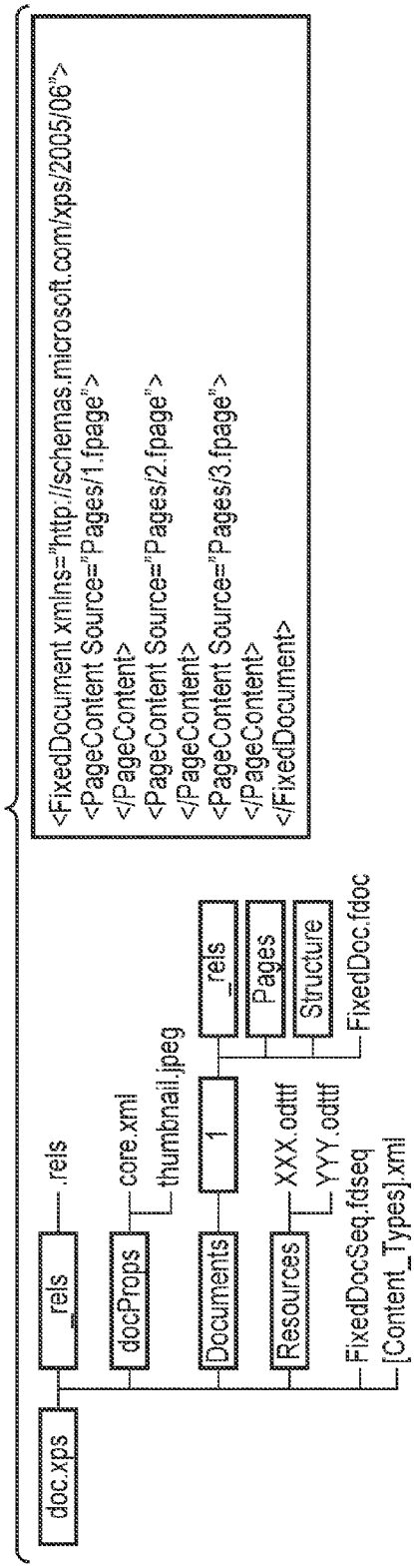

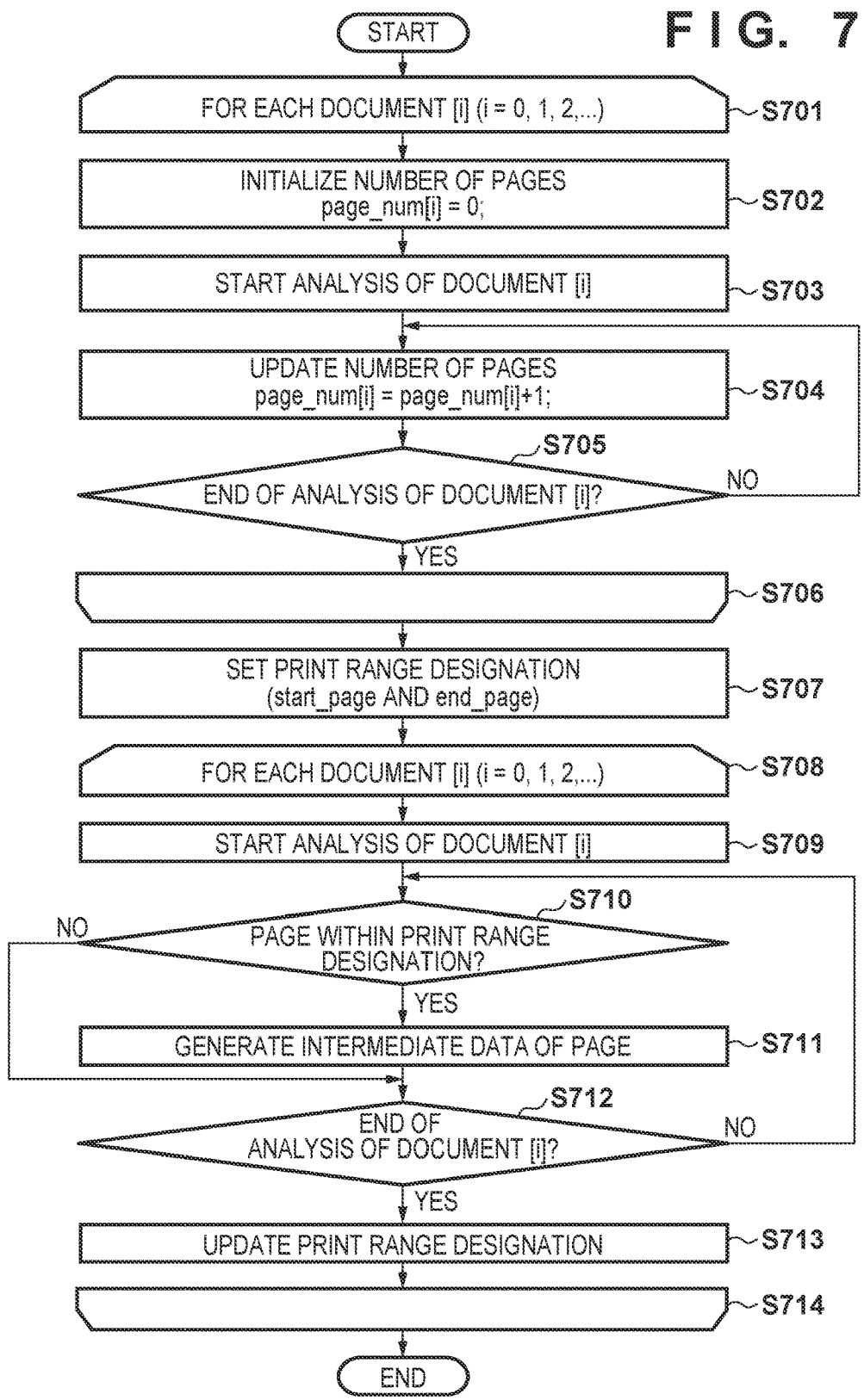

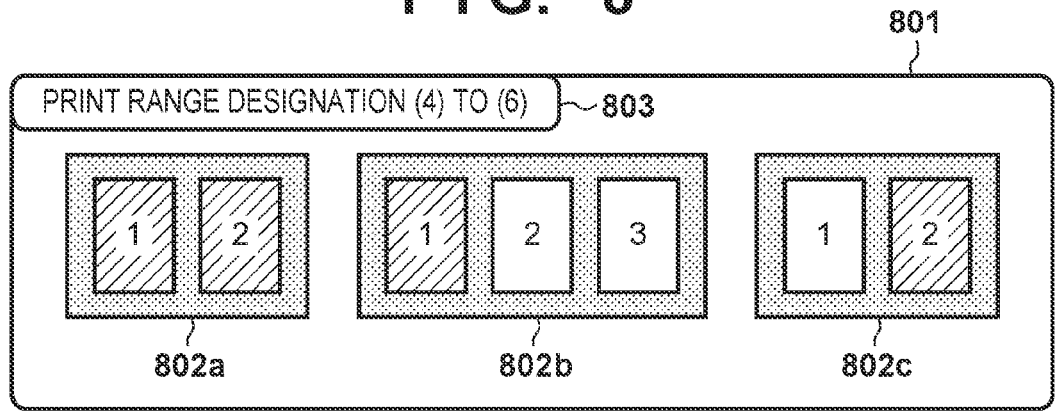
FIG. 8
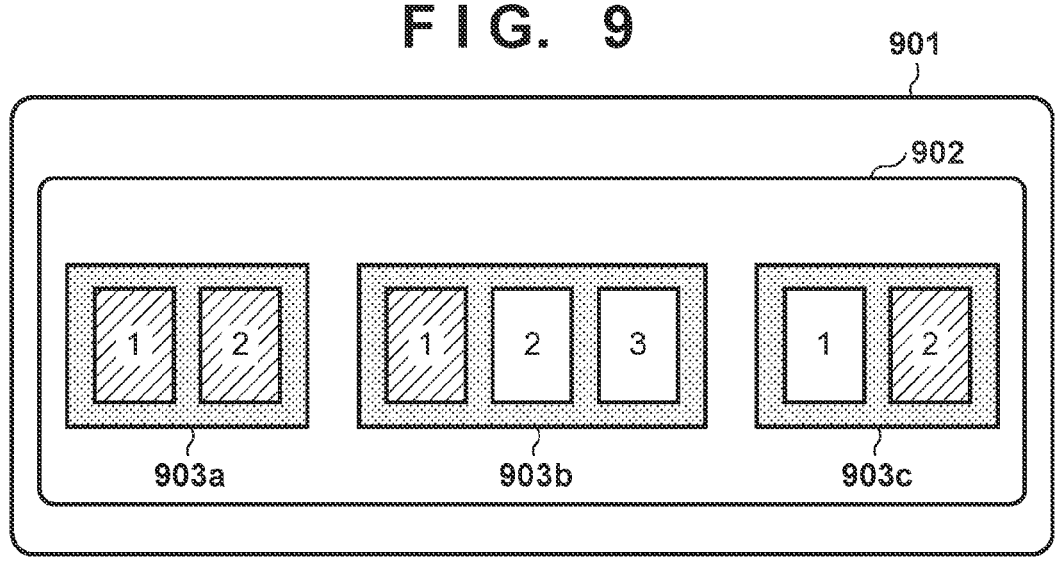
FIG. 9
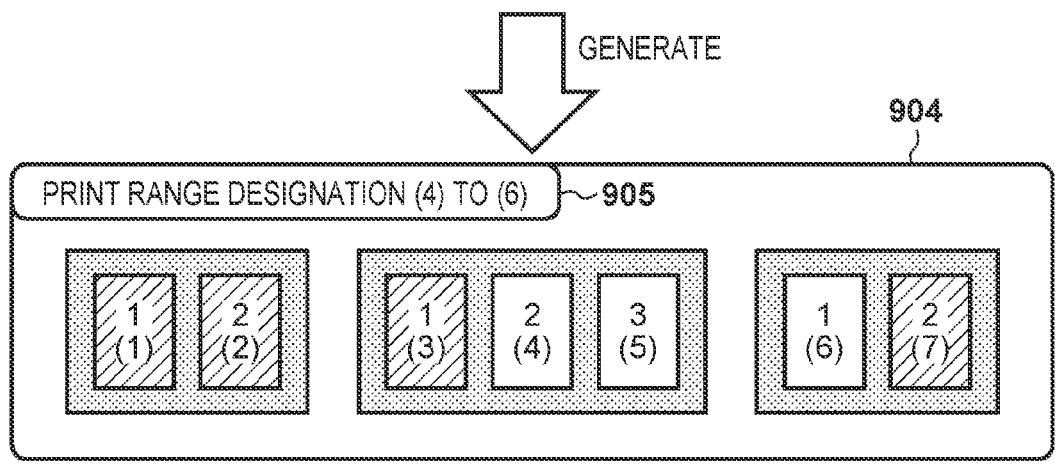

IMAGE FORMING APPARATUS AND INFORMATION PROCESSING APPARATUS CONFIGURED TO PRINT A SPECIFIED PAGE OF A PLURALITY OF DOCUMENTS, CONTROL METHOD THEREOF, AND NON-TRANSITORY COMPUTER-READABLE STORAGE MEDIUM

BACKGROUND OF THE INVENTION

Field of the Invention

The present invention relates to an image forming apparatus that prints a job including a plurality of documents, a control method thereof, and a non-transitory computer-readable storage medium.

Description of the Related Art

Conventionally, there exists a technique of designating a print range and printing a plurality of documents (for example, Japanese Patent Laid-Open No. 2008-210401). In this technique, the information of a page range to be printed in each document is added to the setting information of the document, thereby printing an arbitrary page of each document.

On the other hand, documents handled by a user have many formats such as PDF (Portable Document Format) and PS (PostScript). To allow the user to handle a document without being aware of its format in a print workflow, formats such as JDF (Job Definition Format) capable of managing the pages of a plurality of documents as one job have been proposed.

When using a format capable of managing the pages of a plurality of documents as one job, for example, a job as shown in FIG. 8 is generated by an application. A job 801 includes documents 802a, 802b, and 802c in this order whose total numbers of pages are 2, 3, and 2, respectively. The documents can have different formats. A print range designation 803 is added to the job 801 as the information of a page range to be printed. The print range designation 803 is defined not by the page numbers of the documents but by serial page numbers in the entire job. Since pages 4 to 6 are designated as the print range in the job 801 having seven pages in total, the second and third pages of the document 802b and the first page of the document 802c are printed. At this time, the print range designation is not added to each of the documents 802a to 802c included in the job 801.

When a printing apparatus receives such a job, the number of pages of each document included in the job is unknown. It is therefore impossible to grasp which page of which document corresponds to, for example, the fourth page of the job 801.

Hence, the printing apparatus is required to be able to print even a job including a plurality of documents in different formats and having a print range designation defined by serial page numbers in the entire job.

SUMMARY OF THE INVENTION

According to one aspect of the present invention, there is provided an image forming apparatus that analyzes and prints a job including a plurality of documents, comprising: a management unit configured to obtain information of a page to be printed, which is designated in the job, and manage the information as a print range; and an analysis unit configured to analyze each of the plurality of documents included in the job, wherein the analysis unit calculates the number of pages of each of the plurality of documents, and based on the number of pages of each of the plurality of documents, specifies the page to be printed indicated by the print range out of the plurality of documents.

According to another aspect of the present invention, there is provided a control method of an image forming apparatus that analyzes and prints a job including a plurality of documents, comprising: a management step of obtaining information of a page to be printed, which is designated in the job, and managing the information in a storage unit as a print range; and an analysis step of analyzing, by an analysis unit, each of the plurality of documents included in the job, wherein in the analysis step, the number of pages of each of the plurality of documents is calculated, and the page to be printed indicated by the print range out of the plurality of documents is specified based on the number of pages of each of the plurality of documents.

According to another aspect of the present invention, there is provided a non-transitory computer-readable storage medium storing a program that causes a computer to function as: a management unit configured to obtain information of a page to be printed, which is designated in a job including a plurality of documents, and manage the information as a print range; and an analysis unit configured to analyze each of the plurality of documents included in the job, wherein the analysis unit calculates the number of pages of each of the plurality of documents, and based on the number of pages of each of the plurality of documents, specifies the page to be printed indicated by the print range out of the plurality of documents.

It is possible to print a job including a plurality of documents in different formats and having a print range designation defined by serial page numbers in the entire job.

Further features of the present invention will become apparent from the following description of exemplary embodiments (with reference to the attached drawings).

BRIEF DESCRIPTION OF THE DRAWINGS

FIG. 5 is a flowchart showing details of the process of step S403 according to the second embodiment;

FIGS. 6A and 6B are views for explaining the structures and files of PDF and XPS;

FIG. 7 is a flowchart according to the third embodiment;

FIG. 8 is a view for explaining a job to be processed in the present invention; and FIG. 9 is a view for explaining an example of job generation according to the embodiment.

DESCRIPTION OF THE EMBODIMENTS

The embodiments of the present invention will now be described with reference to the accompanying drawings.

First Embodiment

[Hardware Arrangement]

Figure 1:
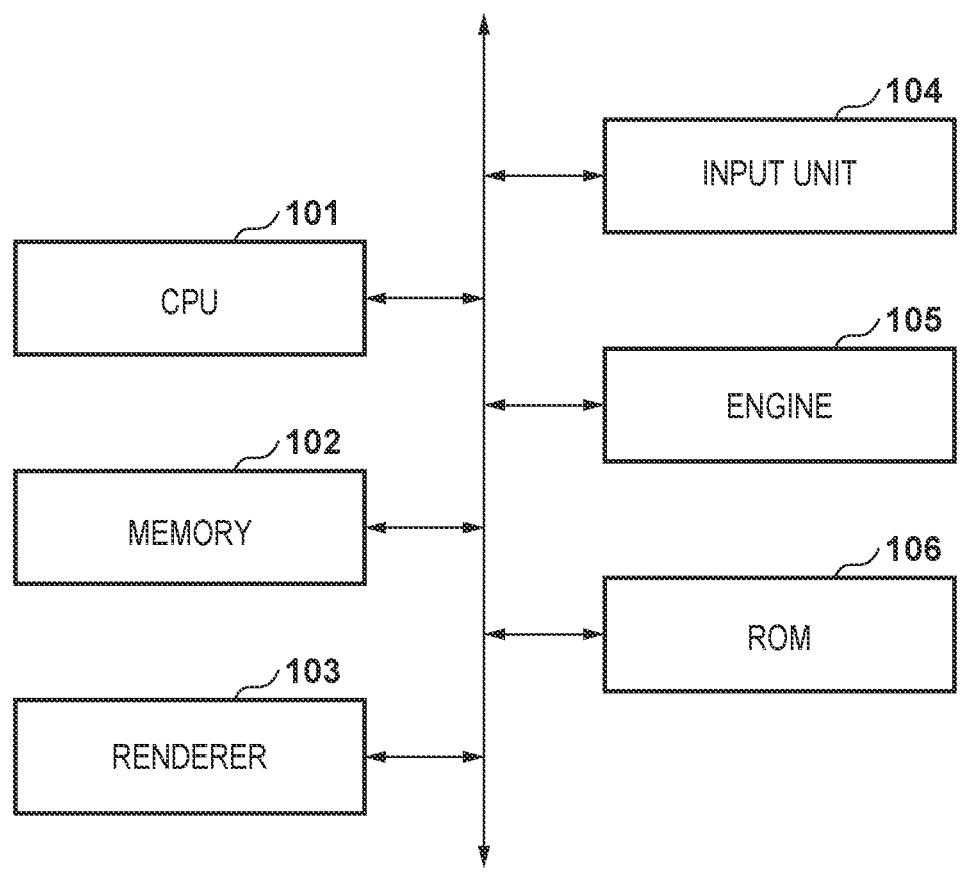
FIG. 1 is a block diagram showing an example of the arrangement of hardware according to the embodiment.

FIG. 1 shows an example of the arrangement of hardware configured to receive a job including a plurality of documents and perform printing in an image forming apparatus according to this embodiment. Note that the image forming apparatus according to the present invention is a network printer, an MFP (Multi-Function Peripheral), or the like but is not particularly limited.

Figure 2:
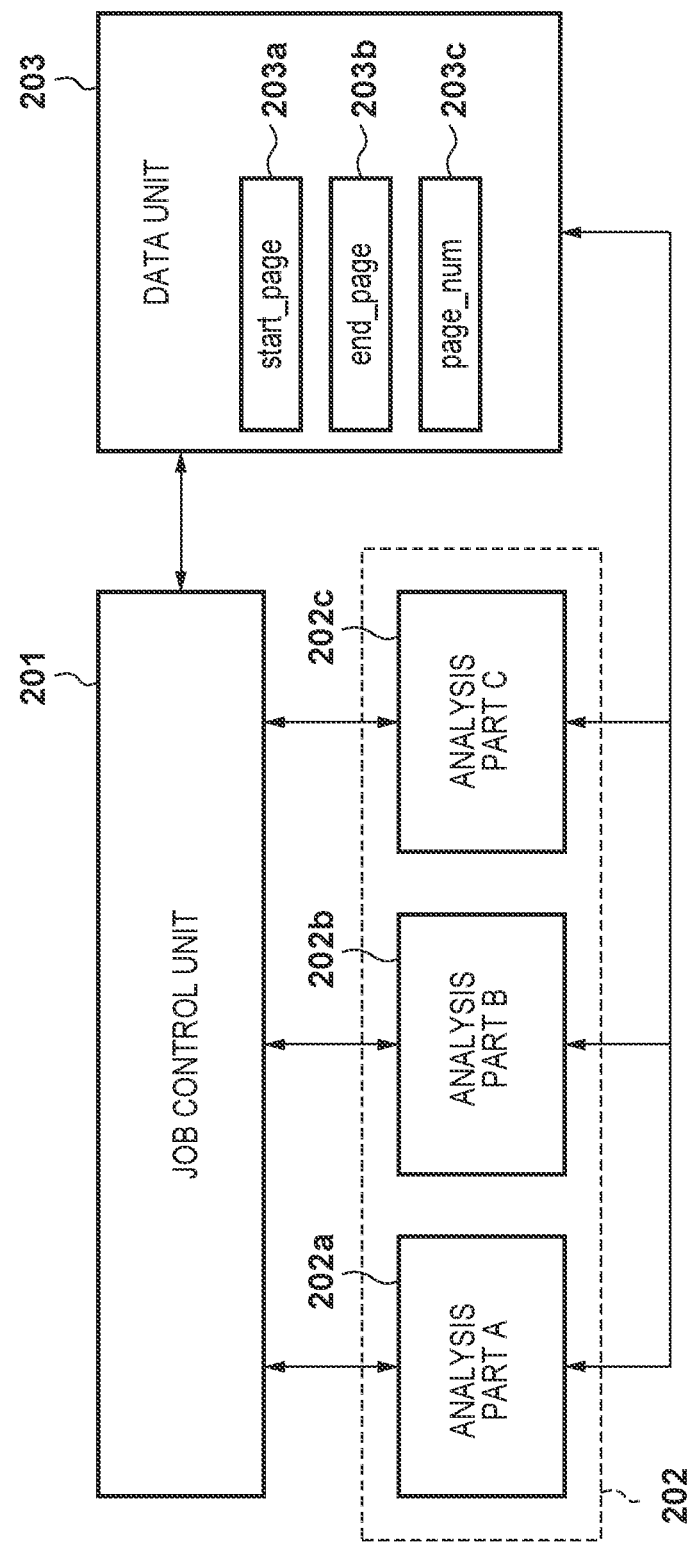
FIG. 2 is a block diagram showing an example of the configuration of software according to the embodiment.

A CPU 101 is a CPU (Central Processing Unit). Software modules to be described later with reference to FIG. 2 are implemented when the CPU 101 reads out and executes a program. A memory 102 is a RAM (Random Access Memory) accessible by the CPU 101. The memory 102 is used as a place to allocate a memory area necessary for the operations of various kinds of software. The memory 102 is also used as a place to save intermediate data generated by an analysis unit 202 as a software module or a bitmap image generated by a renderer 103.

The renderer 103 is hardware that generates a bitmap image from intermediate data generated by the analysis unit 202 as a software module. An input unit 104 receives input of a job including a plurality of documents. An engine 105 is a print unit that outputs the bitmap image generated by the renderer 103 to print paper. A ROM 106 is a nonvolatile storage unit. The software modules to be described later with reference to FIG. 2 are stored in the ROM 106 and read out and executed by the CPU 101.

[Software Configuration]

FIG. 2 shows an example of the configuration of software modules configured to receive a job including a plurality of documents and perform printing in the image forming apparatus according to this embodiment.

A job control unit 201 receives a job including a plurality of documents and requests the analysis unit 202 (one of analysis parts 202a, 202b, and 202c) capable of analyzing each document to analyze the document. In this embodiment, since the types of formats to define the documents are different, a plurality of analysis parts capable of analyzing different formats are provided. The job control unit 201 transfers intermediate data generated by the analysis unit 202 as an analysis result to the renderer 103. The engine 105 outputs a bitmap image generated by the renderer 103 to print paper (print medium).

The analysis unit 202 analyzes the document requested from the job control unit 201 and generates intermediate data necessary for bitmap image generation. Examples of document formats are PDF (Portable Document Format), PS (PostScript), XPS (XML Paper Specification), and JPEG (Joint Photographic Experts Group). In this embodiment, the analysis parts 202a, 202b, and 202c can analyze the document formats PDF, PS, XPS, respectively. Note that the document formats are not limited to those described above, and other formats are also usable. In this case, analysis parts capable of analyzing the formats are separately provided. A data unit 203 stores and manages information (start_page 203a and end_page 203b) of a page range to be printed in the job and the number of pages (page_num 203c) of documents in the print processing step. The start_page 203a represents the first page of the page range, and the end_page 203b represents the last page of the page range. The job control unit 201 and the analysis unit 202 accesses the data unit 203 and execute print processing.

An example of the arrangement of the job handled in this embodiment is the same as in FIG. 8. The job is generated based on a user instruction by an application used in an external information processing apparatus such as a PC (not shown) or a portable terminal (not shown). FIG. 9 shows an example of job generation.

The user opens three documents 903a, 903b, and 903c as one group 902 on an application 901. The pages of the documents are displayed on the application as thumbnails. The user designates pages to be printed by selecting thumbnails. Assume that the user selects the second and third pages of the document 903b and the first page of the document 903c as the pages to be printed. Note that FIGS. 8 and 9 illustrate selected pages by solid white and unselected pates by hatching.

Since the application 901 that opens the documents grasps the number of pages of each document, the pages to be printed can be designated by serial page numbers in the entire group 902. In this case, the application 901 determines that the pages to be printed are the fourth, fifth, and sixth pages of the group 902, and generates a job 904 (that is, a job 801 shown in FIG. 8) as a print job. Referring to FIG. 9, the page numbers in parentheses are serial numbers in the job 904. A print range designation 905 is defined based on the serial numbers.

On the other hand, the image forming apparatus that has received the job cannot know the number of pages of each document included in the job. Hence, the pages of the documents corresponding to the designated serial numbers are unknown. In this embodiment, printing is performed by a method to be described below.

[Processing Procedure]

Figure 3:
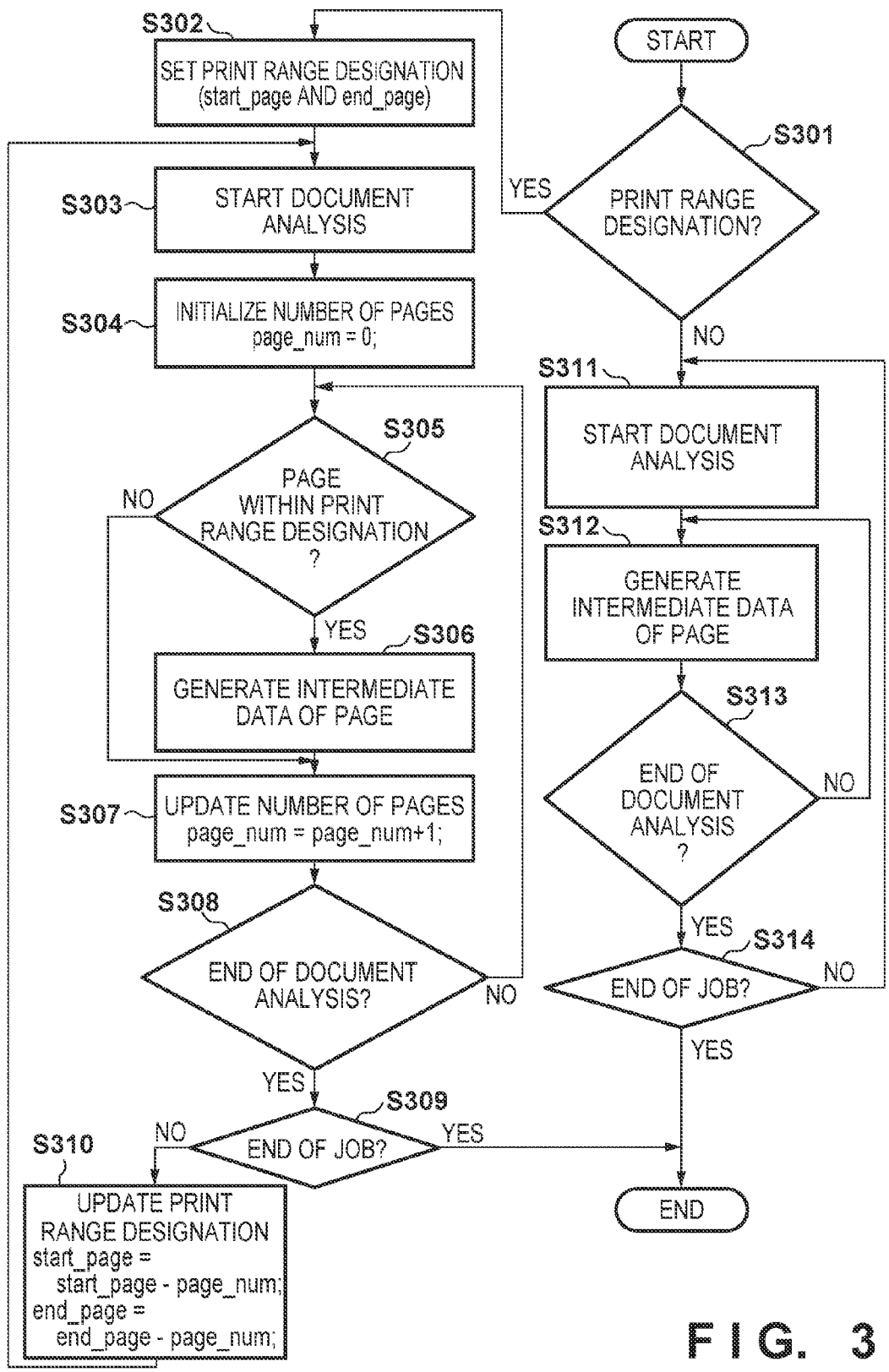
FIG. 3 is a flowchart according to the first embodiment.

FIG. 3 is a flowchart showing processing according to this embodiment. This processing is implemented when the CPU 101 reads out and executes a program stored in the ROM 106 or the like. This processing will be described using the arrangement of the job shown in FIG. 8 together with a detailed example.

In step S301, the job control unit 201 confirms whether the job includes print range designation information. If print range designation information is included (YES in step S301), the process advances to step S302. If a print range designation is not included (NO in step S301), the process advances to step S311.

In step S302, the job control unit 201 stores, in the data unit 203, the print range designation information included in the job. Since the print range designation information in the job indicates pages 4 to 6, as shown in FIG. 8, "4" is stored in the start_page 203a, and "6" is stored in the end_page 203b.

In step S303, the job control unit 201 requests the analysis unit 202 to analyze a document included in the job, thereby starting document analysis. Assume that the formats of three documents 802a, 802b, and 802c included in the job are PDF, PS, XPS, respectively. In this case, the job control unit 201 requests the analysis part 202a capable of analyzing PDF to analyze the first document 802a (PDF).

In step S304, the analysis part 202a initializes the information of the number of pages of the document to "0". As the result of initialization, "0" is stored in the page_num 203c of the data unit 203.

In step S305, the analysis part 202a determines whether the page to be analyzed is a page within the print range designation. If the page is a page within the print range designation (YES in step S305), the process advances to step S306. If the page is a page outside the print range (NO in step S305), the process advances to step S307. More specifically, if $$\text{start\_page} \leq \text{page\_num}+1 \leq \text{end\_page}$$

holds, it is determined that the page is a page within the print range designation. If the expression does not hold, it is determined that the page is a page outside the print range.

Here, start_page=4, end_page=6, and (page_num+1)=0+1=1. Since the expression does not hold, it is determined that the page is a page outside the print range designation, and the process advances to step S307.

In step S307, the analysis part 202a updates the number of pages of the document in the following way, and stores the updated value in the page_num 203c of the data unit 203.

page_num=page_num+1

Here, page_num=page_num+1=0+1=1, and "1" is stored in the page_num 203c.

In step S308, the analysis part 202a determines whether to end the document analysis. If the requested document includes the next page to be analyzed (NO in step S308), the process returns to step S305 to continue the document analysis. If the next page to be analyzed does not exist (YES in step S308), it is determined to end the document analysis, and the process advances to step S309.

In this case, since the next page (the second page of the document 802a (PDF)) exists, the process returns to step S305. From step S305, the process reaches step S309 via the following processing.

S305: start_page=4, end_page=6, and (page_num+1)=(1+1)=2→outside the print range designation S307: page_num=page_num+1=1+1=2

S308: the next page does not exist (YES in step S308)→end document analysis (to step S309)

In step S309, the job control unit 201 determines whether to end the job. If the job includes the next document (NO in step S309), the process advances to step S310 to analyze it. If the next document does not exist (YES in step S309), it is determined to end the job. In this case, since the next document 802b (PS) exists, the process advances to step S310.

In step S310, the job control unit 201 updates the print range designation information in the following way.

start_page=start_page−page_num end_page=end_page−page_num

Since start_page−page_num=4−2=2, and end_page−page_num=6−2=4, "2" is stored in the start_page 203a of the data unit 203 and "4" is stored in the end_page 203b.

The process returns to step S303. The job control unit 201 requests the analysis unit 202 to analyze the next document included in the job, thereby starting document analysis. Since the format of the next document 802b is PS, the job control unit 201 requests the analysis part 202b capable of analyzing PS to analyze the document. After that, from step S304, the process reaches step S306 via the following processing.

S304: page_num=0
S305: start_page=2, end_page=4, (page_num+1)=(0+1)=1→outside the print range designation (NO in step S305)
S307: page_num=page_num+1=0+1=1
S308: the next page exists (NO in step S308)→continue document analysis (to step S305)
S305: start_page=2, end_page=4, (page_num+1)=(1+1)=2→within the print range designation (YES in step S305)

In step S306, the analysis part 202b generates the intermediate data of the analyzed page. As described above, the job control unit 201 transfers the intermediate data to the renderer 103, and the engine 105 outputs a bitmap image generated from the intermediate data by the renderer 103 to print paper. That is, the second page of the document 802b (PS) included in the job 801 is output at this timing. Similarly, from step S307, the following processing is performed to output the third page of the document 802b (PS), and the process reaches step S309 again.

S307: page_num=page_num+1=1+1=2
S308: the next page exists (NO in step S308)→continue document analysis (to step S305)
S305: start_page=2, end_page=4, (page_num+1)=2+1=3→within the print range designation (YES in step S305)
S306: generate intermediate data (output of the third page of the document 802b)
S307: page_num=page_num+1=2+1=3
S308: the next page does not exist (YES in step S308)→end document analysis (to step S309)
S309: the next document 802c (XPS) exists (to step S310)

In step S310, the job control unit 201 updates the start_page 203a and the end_page 203b in the print range designation in the following way.

start_page=start_page−page_num=2−3=−1 end_page=end_page−page_num=4−3=1

After updating the print range designation, the process returns to step S303. The job control unit 201 requests the analysis unit 202 to analyze the next document included in the job, thereby starting document analysis. Since the format of the next document 802c is XPS, the job control unit 201 requests the analysis part 202c capable of analyzing XPS to analyze the document. After that, from step S304, the following processing is performed to output the first page of the document 802c (XPS), and the process reaches step S309.

S304: page_num=0
S305: start_page=−1, end_page=1, (page_num+1)=0+1=1→within the print range designation (YES in step S305)
S306: generate intermediate data (output of the first page of the document 802c)
S307: page_num=page_num+1=0+1=1
S308: the next page exists (NO in step S308)→continue document analysis (to step S305)
S305: start_page=−1, end_page=1, (page_num+1)=1+1=2→outside the print range designation (NO in step S305)
S307: page_num=page_num+1=1+1=2
S308: the next page does not exist (YES in step S308)→end document analysis (to step S309)

Since the job 801 does not include the next document (YES ins step S309), the job control unit 201 ends the processing procedure. As a result, the following three pages are printed.

the second page of the document 802b (PS)
the third page of the document 802b (PS)
the first page of the document 802c (XPS)

Steps S311 to S314 are processes performed in a case where the received job including the plurality of documents has no print range designation information. If no print range designation information exists (NO in step S301), the job control unit 201 sequentially analyzes and prints the documents included in the job.

In step S311, the job control unit 201 requests the analysis unit 202 (one of the analysis parts 202a, 202b, and 202c) to analyze a document included in the job, thereby starting document analysis. As described above, the job control unit 201 requests an analysis part capable of analyzing the document to do analysis.

In step S312, the analysis unit 202 generates the intermediate data of the analyzed page. As described above, the job control unit 201 transfers the intermediate data to the renderer 103, and the engine 105 outputs a bitmap image generated from the intermediate data by the renderer 103 to print paper.

In step S313, the analysis unit 202 determines whether to end the document analysis. If the next page to be analyzed exists (NO in step S313), the process returns to step S312 to continue the document analysis. If the next page to be analyzed does not exist (YES in step S313), the analysis unit 202 determines to end the document analysis, and the process advances to step S314.

In step S314, the job control unit 201 determines whether to end the job. If the job includes the next document (NO in step S314), the process returns to step S311 to analyze it. If the next document does not exist (YES in step S314), it is determined to end the job.

As described above, according to this embodiment, the printing apparatus can print a job including a plurality of documents in different formats and having a print range designated by serial page numbers in the entire job, improving user convenience.

Note that although an example in which consecutive pages are designated as the print range has been described in this embodiment, the present invention is not limited to this. For example, the job may designate, by serial numbers, pages that are not consecutive in a plurality of documents.

Second Embodiment

Figure 4:
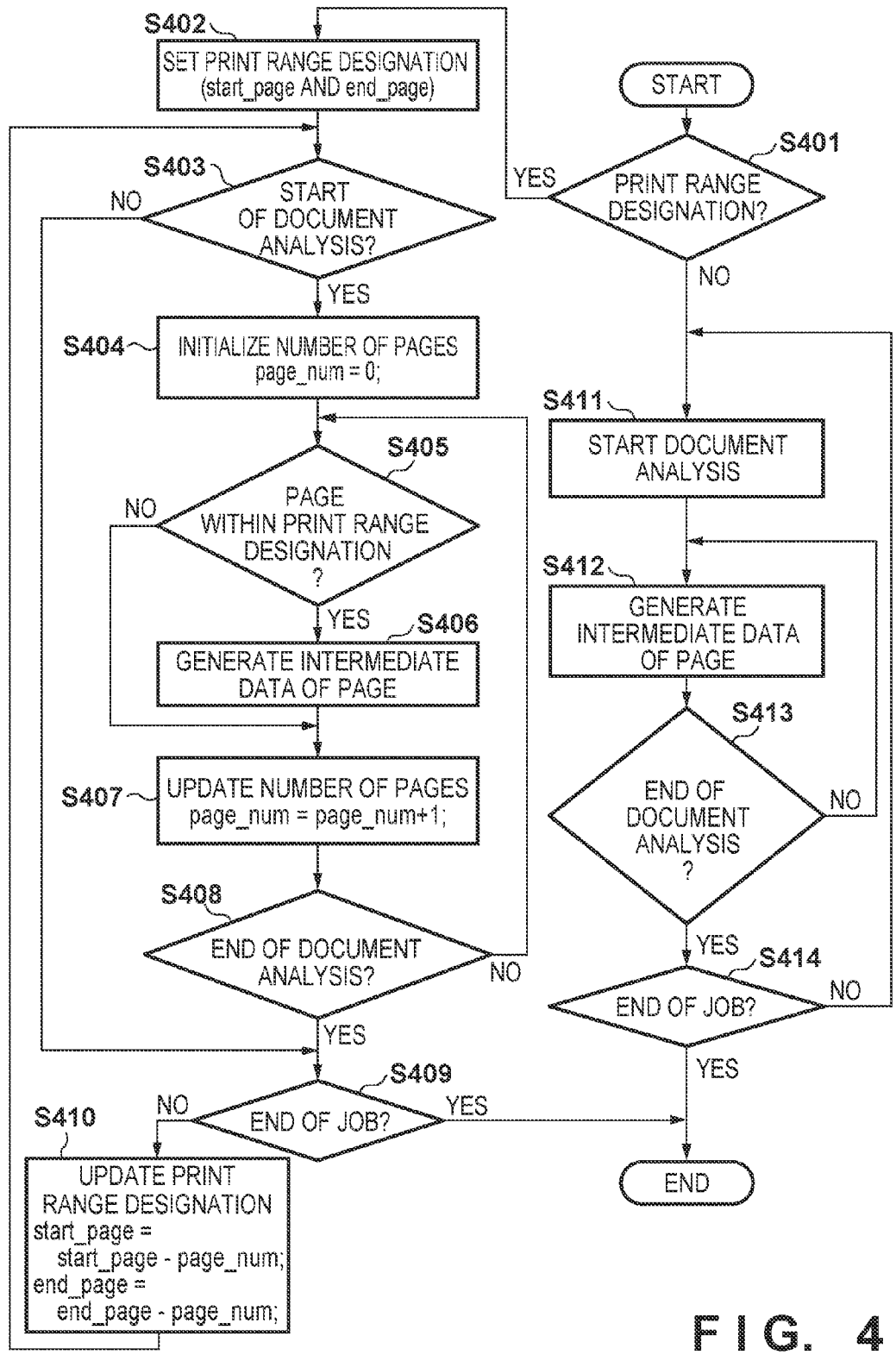
FIG. 4 is an overall flowchart according to the second embodiment.

Processing according to this embodiment improves the first embodiment, and FIG. 4 is a flowchart showing overall processing. This embodiment (FIG. 4) is different from the first embodiment (FIG. 3) only in that the process of step S303 in FIG. 3 changes to the conditional branch of step S403 in FIG. 4. The conditional branch process of step S403 will be described here in detail, and a description of other processes will be omitted. FIG. 5 shows details of the process of step S403. The processes shown in FIGS. 4 and 5 are implemented when a CPU 101 reads out and executes a program stored in a ROM 106 or the like.

In step S501, a job control unit 201 requests an analysis unit 202 to analyze a document included in a job, thereby starting document analysis.

In step S502, the job control unit 201 switches a method of updating page_num in accordance with the document to be analyzed immediately after the start of document analysis. If the document is PDF, the process advances to step S503. If the document is XPS, the process advances to step S504. If the document is JPEG, the process advances to step S505. If the document is PS, the process advances to step S507. In PS, the number of pages is unknown before the file is analyzed sequentially from the head to end because of the data structure. For this reason, from step S507, the pages are sequentially analyzed, as in the first embodiment, thereby calculating the number of pages of the document.

In step S503, an analysis part 202a capable of analyzing PDF obtains the information of the number of pages from a page tree included in the PDF. In the first embodiment, pages are sequentially analyzed to obtain the number of pages of a PDF document. However, since PDF is a format having a tree structure, the number of pages of a document can be obtained by referring to the page tree.

FIG. 6A shows an example of the tree structure of a PDS document with three pages and the contents of the file. In this case, "3" of "Count 3" described in the file corresponds to the number of pages, and the analysis part 202a stores "3" in page_num 203c of the data unit.

In step S504, an analysis part 202c capable of analyzing XPS obtains the information of the number of pages from a FixedDocument part included in the XPS. In the first embodiment, pages are sequentially analyzed to obtain the number of pages of XPS. However, since XPS is a format having a folder structure, the number of pages of a document can be obtained by referring to a file existing in a specific folder.

FIG. 6B shows an example of the folder structure of an XPS document with three pages and the contents of a file (FixedDoc.fdoc) existing in a specific folder (Documents). In this case, the number of times of appearance of </PageContent> (here, three times) described in the file corresponds to the number of pages, and the analysis part 202c stores "3" in the page_num 203c of a data unit 203.

In step S505, an analysis unit (not shown) capable of analyzing JPEG stores "1" in the page_num 203c of the data unit 203. Since JEPG always has one page because of the format standards, the number of pages is "1". The JPEG analysis part (not shown) stores "1" in the page_num 203c of the data unit 203.

In step S506, the analysis unit 202 determines based on the number of pages of the document whether the document is a document within the print range designation. If the document is a document within the print range designation (YES in step S506), the process advances to step S507. If the document is a document outside the print range designation (NO in step S506), the process advances to step S508. In this case, if $$page\_num \geq start\_page$$

holds, it is determined that the document is a document within the print range designation. If the expression does not hold, it is determined that the document is a document outside the print range designation.

In step S507, the analysis unit 202 continues the document analysis. That is, processing from step S404 of FIG. 4 is continued.

In step S508, the analysis unit 202 ends the document analysis. That is, processing from step S409 of FIG. 4 is continued.

As in the first embodiment, assume that the formats of three documents 802a, 802b, and 802c included in a job 801 shown in FIG. 8 are PDF, PS, XPS, respectively. In this case, from step S401 (of FIG. 4), the process reaches step S506 via the following processing.

S401: print range designation exists (YES in step S401)
S402: start_page=4, end_page=6
S501: start document analysis
S502: document=PDF
S503: page_num=2

In step S506, since start_page=4 and page_num=2, the document 802a (PDF) is determined to be a document outside the print range designation (NO in step S506). In step S508, the analysis part 202a ends the document analysis of the PDF, and the process advances to processing from step S409 of FIG. 4. With this processing, analysis of the next document 802b (PS) can be started more quickly than the first embodiment without analyzing the pages of the document 802a (PDF) outside the print range designation at all.

According to this embodiment, the number of pages is calculated in a document whose number of pages can be calculated at low cost, and analysis processing of a document outside the print range designation is omitted. This can speed up print processing as compared to the first embodiment.

Third Embodiment

FIG. 7 is a flowchart showing processing according to the third embodiment. In the first and second embodiments, document analysis and printing are executed in the order of documents included in a job. In this embodiment, analysis of all documents included in a job is performed first. After the analysis is wholly completed, printing of all documents is executed. The processing shown in FIG. 7 is implemented when a CPU 101 reads out and executes a program stored in a ROM 106 or the like.

Step S701 indicates that a job control unit 201 repeats processing up to step S706 for each document [i] (i=0, 1, 2, . . . ) included in a job.

In step S702, the job control unit 201 requests an analysis unit 202 to analyze the document [i] included in the job, thereby starting document analysis.

In step S703, the analysis unit 202 initializes the information of the number of pages of the document [i], and stores "0" in page_num[i] (not shown) of a data unit 203.

In step S704, the analysis unit 202 analyzes the document [i] and updates the information of the number of pages. Unlike the first embodiment, the analysis unit 202 executes only analysis of the document [i] and does not perform intermediate data generation.

In step S705, the analysis unit 202 determines whether the analysis of the document [i] has ended. If the analysis has ended (YES in step S705), the process advances to step S706. If the analysis has not ended (NO in step S705), the process returns to step S704 to continue the analysis processing.

In step S706, if the job control unit 201 determines that all the processes up to step S705 have ended for each document [i] (i=0, 1, 2, . . . ), the process advances to step S707.

In step S707, the job control unit 201 stores print range designation information in start_page 203a and end_page 203b of the data unit 203.

Step S708 indicates that the job control unit 201 repeats processing up to step S714 for each document [i] (i=0, 1, 2, . . . ) included in the job. In steps S709 to S712, the analysis unit 202 performs document analysis and generates intermediate data for a page within the print range designation, as in the first embodiment.

In step S713, the job control unit 201 updates the print range designation information in the following way.

start_page=start_page−page_num[$i$]

end_page=end_page−page_num[$i$]

In step S714, if the job control unit 201 determines that all the processes up to step S713 have ended for each document [i] (i=0, 1, 2, . . . ), the processing procedure ends.

The processing according to this embodiment is effective in a case where, for example, the total number of pages of an entire job is obtained or displayed immediately by previewing the pages included in the job. In this embodiment, analysis processing is executed twice for each document. To improve performance, processing of switching the method of calculating the number of pages of a document in accordance with the document type may be performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-210168, filed Oct. 14, 2014, which is hereby incorporated by reference herein in its entirety.

What is claimed is:

1. An image forming apparatus, comprising:
one or more controllers, having a processor which executes instructions stored in a memory or having a circuit, configured to perform:
a process of receiving a print job including a first document file and a second document file, wherein the first document file includes one or more pages and the second document file includes one or more pages;
a process of obtaining information including a position of at least one target page in all pages in the print job; and
a process of causing image forming of the at least one target page indicated by the obtained information,
wherein the first document file includes first information used for determining a position of a page in all pages of the first document file and the second document file includes second information used for determining a position of a page in all pages of the second document file, and
wherein the one or more controllers determine the at least one target page based on the obtained information and at least one of the first information and the second information.

2. The apparatus according to claim 1,
wherein the one or more controllers further perform a process of analyzing each of the plurality of document files included in the job, and
wherein the process of analyzing includes a plurality of processes capable of analyzing different document files.

3. The apparatus according to claim 1, wherein the one or more controllers start the image forming device to print after all pages to be printed are specified.

4. The apparatus according to claim 1, wherein the first document file corresponds to one of PDF, PS, or XPS files, and the second document file corresponds to one of PDF, PS, or XPS files.

5. The apparatus according to claim 1,
wherein the first document file includes information of a number of pages included in the first document file, and
wherein the one or more controllers determine the at least one target page in the second document file based on the obtained information and the information of number of pages of the first document file and the second information.

6. The apparatus according to claim 1,
wherein the first document file includes information of a number of pages included in the first document file, and
wherein the one or more controllers determine the at least one target page based on the obtained information, the information of number of pages of the first document file, the first information and the second information.

7. The apparatus according to claim 1, wherein the image forming is printing.

8. The apparatus according to claim 1, wherein the position of a target page is a page number in all pages in the print job.

9. The apparatus according to claim 1, wherein the position of a page in all pages of the first document file is a page number in all pages of the first document file.

10. An information processing apparatus, comprising:
one or more controllers, having a processor which executes instructions stored in a memory or having a circuit, configured to perform:
a process of obtaining a print job including a plurality of documents, wherein the plurality of documents include a first document having a first document format and a second document having a second document format different from the first document format, and wherein the first document includes one or more pages and the second document includes one or more pages, and wherein the first document includes respective page numbers in the first document for each of the one or more pages in the first document and the second document includes respective page numbers in the second document for each of the one or more pages in the second document;
a process of obtaining at least one page number indicating a position of at least one target page of which image forming is to be performed in all pages in the print job; and
a process of causing image forming of the at least one target page based on the obtained at least one page number, and at least one of the respective page numbers in the first document and the respective page numbers in the second document.

11. The information processing apparatus according to claim 10, wherein the print job does not include respective page numbers for each page in the print job indicating a position of the each page in all pages in the print job.

12. The information processing apparatus according to claim 10, wherein the one or more controllers is configured to perform:
a process of specifying at least one page corresponding to the obtained at least one page number by at least subtracting a total page number of the one or more pages of the first document from the obtained at least one page number, and wherein in the process of causing the image forming, the image forming of the specified one or more pages is caused.

13. A control method of controlling an information processing apparatus, the method comprising:
obtaining a print job including a plurality of documents, wherein the plurality of documents include a first document having a first document format and a second document having a second document format different from the first document format, and wherein the first document includes one or more pages and the second document includes one or more pages, and wherein the first document includes respective page numbers in the first document for each of the one or more pages in the first document and the second document includes respective page numbers in the second document for each of the one or more pages in the second document;
obtaining at least one page number indicating a position of at least one target page of which image forming is to be performed in all pages in the print job; and
causing image forming of the at least one target page based on the obtained at least one page number, and at least one of the respective page numbers in the first document and the respective page numbers in the second document.

14. A non-transitory computer-readable medium storing a program which, when executed by a processor of a computer, causes the computer to:
obtain a print job including a plurality of documents, wherein the plurality of documents include a first document having a first document format and a second document having a second document format different from the first document format, and wherein the first document includes one or more pages and the second document includes one or more pages, and wherein the first document includes respective page numbers in the first document for each of the one or more pages in the first document and the second document includes respective page numbers in the second document for each of the one or more pages in the second document;
obtain at least one page number indicating a position of at least one target page of which image forming is to be performed in all pages in the print job; and
cause image forming of the at least one target page based on the obtained at least one page number, and at least one of the respective page numbers in the first document and the respective page numbers in the second document.

15. An image forming apparatus, comprising:
one or more controllers, having a processor which executes instructions stored in a memory or having a circuit, configured to perform:
a process of receiving a print job including a first document file and a second document file, wherein the first document file includes one or more pages and the second document file includes one or more pages;
a process of obtaining page number information of at least one target page in all pages in the print job;
a process of specifying, based on the obtained page number information and at least one of a page number of a page in all pages in the first document file and a page number of a page in all pages in the second document file, at least one page of the one or more pages in the first document file and the one or more pages in the second document file; and a process of causing image forming of the specified at least one page.

16. The apparatus according to claim 15, wherein the process of specifying specifies the at least one page based on the obtained page number information and one of a total page number of the one or more pages in the first document file and a total page number of the one or more pages in the second document file.

17. The apparatus according to claim 15, wherein the process of specifying specifies the at least one page of the second document file based on the obtained page number information and a total page number of the one or more pages in the first document file when the page number information of the at least one target page in all pages in the print job is greater than the total page number.

18. The apparatus according to clam 15,
wherein a number of the all pages in the first document file is N, a number of the all pages in the second document file is M and a number of the all pages in the print job is a sum of N and M,
wherein the page number of the page in all pages in the first document file is a number among numbers from 1 to N,
wherein the page number of the page in all pages in the second document file is a number among numbers from 1 to M,
wherein the page number information is in a range of numbers from 1 to the sum of N and M.

19. An image forming apparatus, comprising:
one or more controllers, having a processor which executes instructions stored in a memory or having a circuit, configured to perform:

a process of receiving a print job including a first document file and a second document file, wherein the first document file includes one or more pages and the second document file includes one or more pages;
a process of obtaining page number information of at least one target page in all pages in the print job;
a process of specifying, based on the obtained page number information and a total page number of the one or more pages in the first document file, at least one page of the one or more pages in the second document file; and
a process of causing image forming of the specified at least one page.

20. The apparatus according to claim 19, wherein the process of specifying specifies, based on the obtained page number information and the total page number of the one or more pages in the first document file, at least one page of the one or more pages in the second document file, in a case where the page number information of the at least one target page in all pages in the print job is greater than the total page number of the one or more pages in the first document file.

21. The apparatus according to clam 19,
wherein the total page number of the one or more pages in the first document file is N and a total page number of the one or more pages in the second document file is M,
wherein a page number of the at least one page of the one or more pages in the second document file is in a range of numbers from 1 to M,
wherein the page number information is in a range of numbers from 1 to the sum of N and M.

* * * * *